(12) United States Patent  
Huard

(10) Patent No.: US 8,998,033 B2
(45) Date of Patent: Apr. 7, 2015

(54) MATERIAL DISPENSER

(71) Applicant: Paul Maurice Huard, Anaheim, CA (US)

(72) Inventor: Paul Maurice Huard, Anaheim, CA (US)

(*) Notice: Subject to any disclaimer, the term of this patent is extended or adjusted under 35 U.S.C. 154(b) by 111 days.

(21) Appl. No.: 13/861,674

(22) Filed: Apr. 12, 2013

(65) Prior Publication Data

US 2013/0277386 A1 Oct. 24, 2013

Related U.S. Application Data

(60) Provisional application No. 61/635,338, filed on Apr. 19, 2012.

(51) Int. Cl.
| | |
|---|---|
| *B65H 1/08* | (2006.01) |
| *B65G 59/00* | (2006.01) |
| *B65H 3/00* | (2006.01) |
| *B65H 3/02* | (2006.01) |
| *B65G 47/82* | (2006.01) |
| *A47K 10/42* | (2006.01) |
| *A47K 10/32* | (2006.01) |

(52) U.S. Cl.
CPC .............. *B65G 47/82* (2013.01); *A47K 10/422* (2013.01); *A47K 2010/3266* (2013.01)

(58) Field of Classification Search
USPC .................. 221/277, 43, 46, 26, 97, 231, 259
See application file for complete search history.

(56) References Cited

U.S. PATENT DOCUMENTS

| | | | | |
|---|---|---|---|---|
| 479,688 A | * | 7/1892 | Weller | 194/286 |
| 763,750 A | * | 6/1904 | Grimes | 222/410 |
| 937,584 A | * | 10/1909 | Fitch | 221/231 |
| 1,088,142 A | * | 2/1914 | Gardner | 221/231 |
| 1,131,112 A | * | 3/1915 | Brown | 221/231 |
| 1,752,885 A | * | 4/1930 | Carroll | 221/41 |
| 2,288,979 A | * | 7/1942 | Testi | 221/231 |
| 2,620,061 A | * | 12/1952 | Uxa | 221/229 |
| 2,639,959 A | * | 5/1953 | Couden | 221/43 |
| 3,009,604 A | * | 11/1961 | Gothreau | 221/23 |
| 3,370,747 A | * | 2/1968 | Desmond | 221/26 |
| 4,256,237 A | * | 3/1981 | Desmond | 221/26 |
| 4,324,345 A | * | 4/1982 | Martinez | 221/41 |
| 4,524,884 A | * | 6/1985 | Myers | 221/231 |
| 4,662,536 A | * | 5/1987 | Powers | 221/43 |
| 4,711,378 A | * | 12/1987 | Anderson | 222/499 |
| 5,071,033 A | * | 12/1991 | Siwek | 221/229 |
| 5,080,258 A | * | 1/1992 | Hinterreiter | 221/198 |
| 5,096,091 A | * | 3/1992 | Heu | 221/212 |
| 5,335,817 A | * | 8/1994 | Powers | 221/43 |
| 5,388,724 A | * | 2/1995 | Adams et al. | 221/259 |
| 5,560,516 A | * | 10/1996 | Hinterreiter | 221/247 |
| 5,617,973 A | * | 4/1997 | Seto et al. | 221/56 |
| 6,155,456 A | * | 12/2000 | Archer | 221/231 |

(Continued)

*Primary Examiner* — Rakesh Kumar

(57) ABSTRACT

A material dispenser includes a base, a platen, a spring, a casing, a material pick-up mechanism, and a cap. The spring is connected in between the platen and the base, and the casing encloses the spring and the platen and removably attaches with the base. The material pick-up mechanism is rotatably connected with the casing opposite from the base. The cap attaches with the casing opposite from the base and positions adjacent with the material pick-up mechanism. The material dispenser includes stored materials in between the platen and the material pick-up mechanism. The casing provides a parameter wall for the stored materials. The users of the material dispenser can dispense an exact amount of the stored materials through a top opening of the casing by rotating the material pick-up mechanism.

14 Claims, 11 Drawing Sheets

(56) References Cited

U.S. PATENT DOCUMENTS 6,425,500 B2 * 7/2002 McNally ................ 222/175
7,017,780 B2 * 3/2006 Renaud ................ 221/263
2001/0032859 A1 * 10/2001 Coleman ................ 221/213
2009/0272755 A1 * 11/2009 Burns ................ 221/43

* cited by examiner

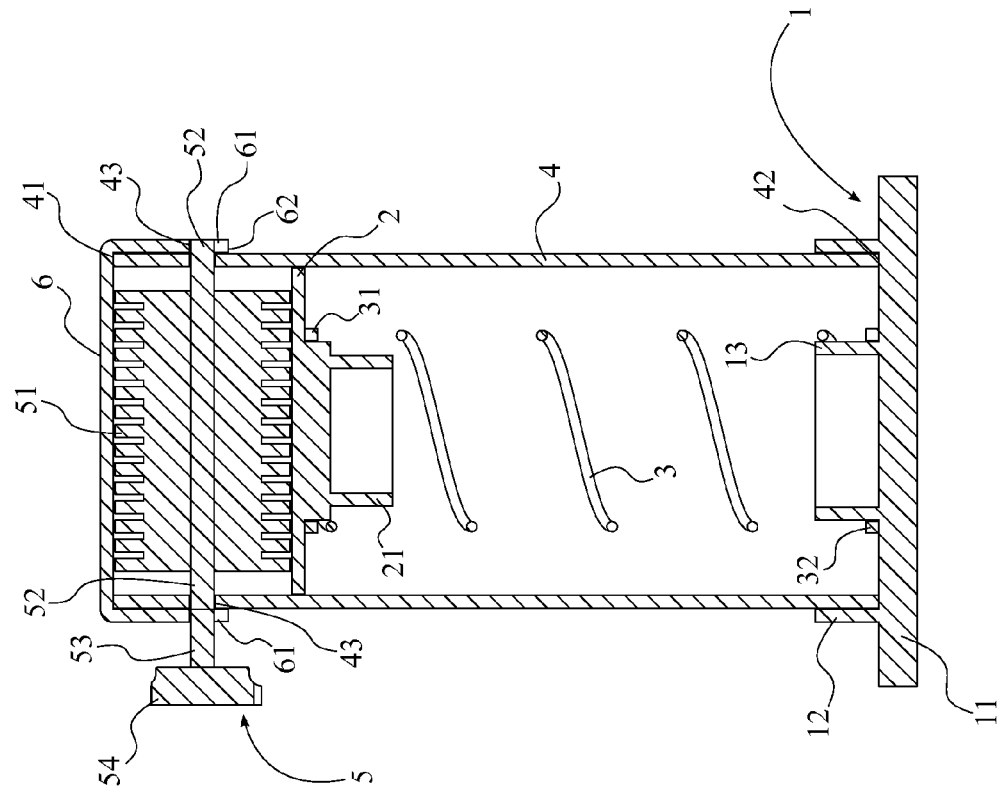
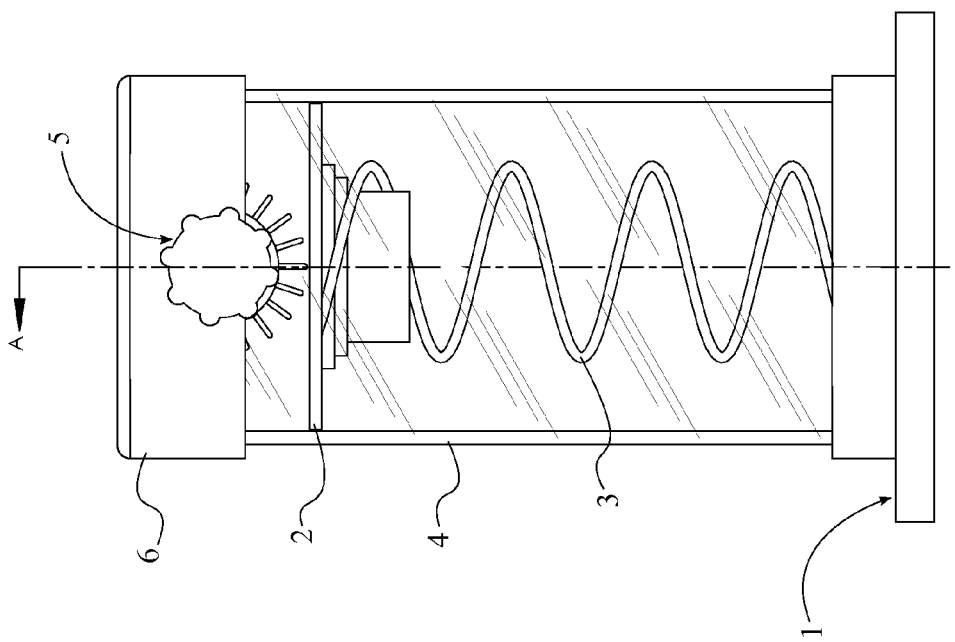
FIG. 8
FIG. 9

MATERIAL DISPENSER

The current application claims a priority to the U.S. Provisional Patent application Ser. No. 61/635,338 filed on Apr. 19, 2012.

FIELD OF THE INVENTION

The present invention relates generally to an apparatus for a material dispenser. More specifically the present is an apparatus for a reusable material dispenser that dispenses exact amount of material.

BACKGROUND OF THE INVENTION

A fabric-like tissue or cloth is preferred by the public for all kinds of different purposes, such as cleaning, refreshing, or hygienic needs. Most of the fabric-like tissue or cloth retails in packages, and once the package is opened, the fabric-like tissue or cloth tends dry out, misplaced, get dirty over time. This results into more expenses and inconvenience for consumers as the useful fabric-like tissue or cloth may not available to the consumers when necessary.

It therefore an objective of the present invention to introduce a material dispenser that dispenses exact amount of material, which is fabric-like tissue or cloth, while keeping the material clean and fresh within the present invention. There are currently no material dispensers that comprise a material pick-up mechanism that extracts the material for a user's use. It is also desirable for the user to be able to dispense the perfect amount of the material for the user's use through the material pick-up mechanism. When all the stored material has been used, the material dispenser can be opened up to insert new material so that the present invention can be reused. The present invention can also be easily carried by the user to remote locations while keeping the stored material safe within the present invention.

BRIEF DESCRIPTION OF THE DRAWINGS

FIG. 8 is a side view of the present invention, showing the plane upon which a cross sectional view is taken shown in FIG. 9.

FIG. 9 is a cross section view thereof taken along line A-A of FIG. 8.

DETAIL DESCRIPTIONS OF THE INVENTION

All illustrations of the drawings are for the purpose of describing selected versions of the present invention and are not intended to limit the scope of the present invention.

Figure 1:
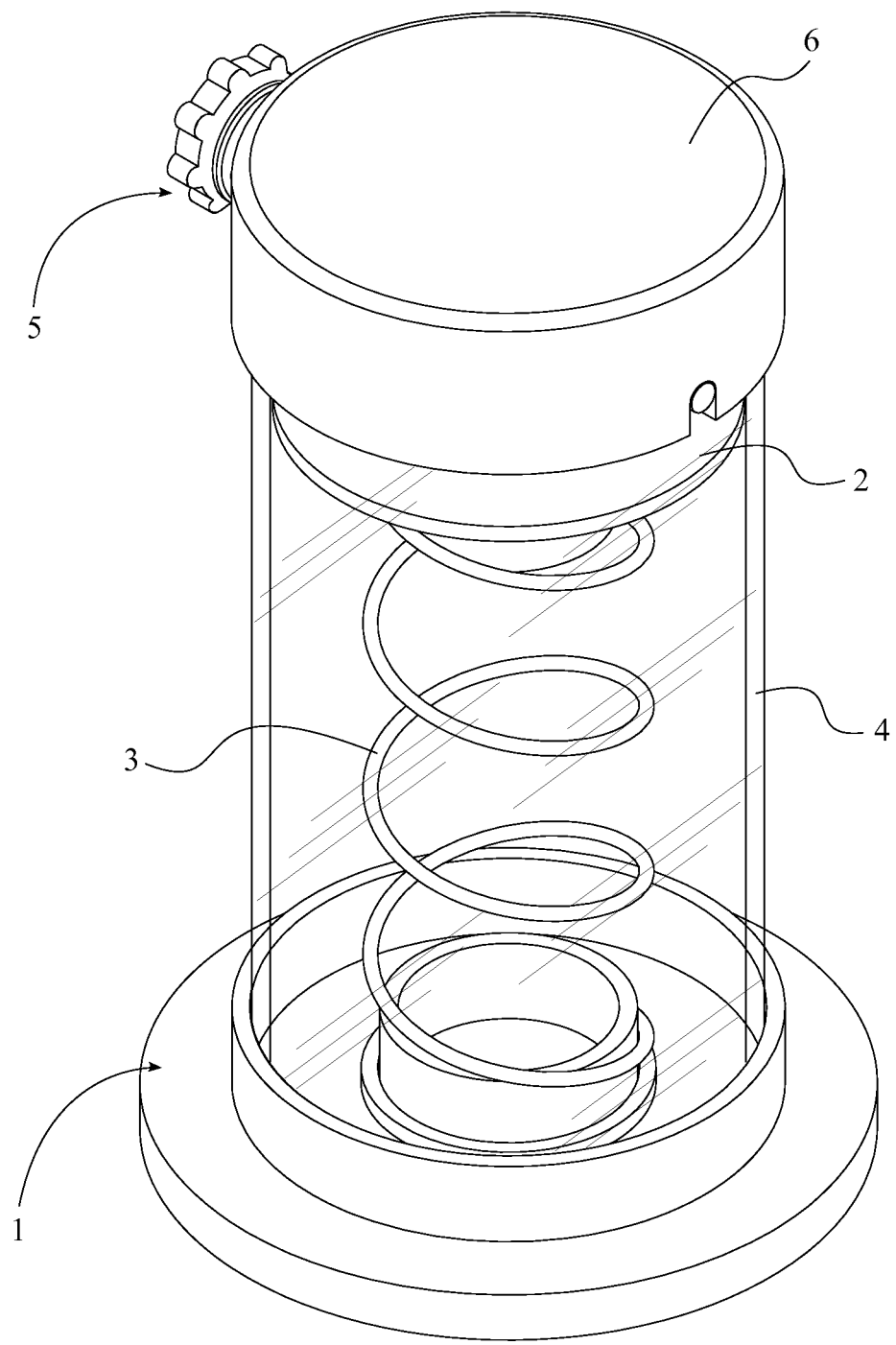
FIG. 1 is a perspective view of the present invention.
Figure 12:
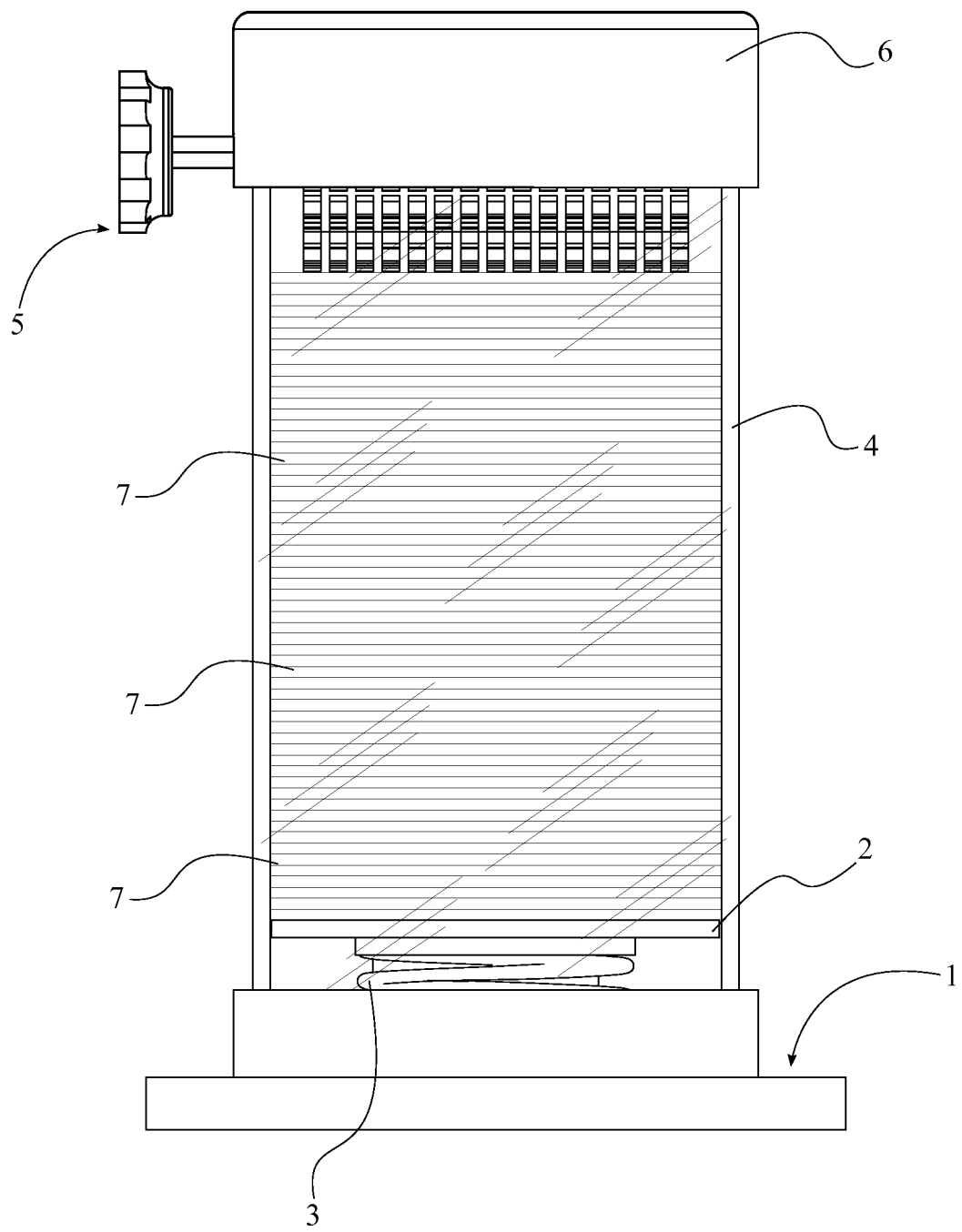
FIG. 12 is a front view of the present invention and a plurality of stored materials, wherein the spring is at its compressed state.

In reference to FIG. 1 and FIG. 12, the present invention is an apparatus for a material dispenser which dispenses materials 7 such as paper, cloth, leather, patches, or any desired material as the materials 7 are stored within the present invention. The present invention comprises a base 1, a platen 2, a spring 3, a casing 4, a material pick-up mechanism 5, and a cap 6. Even though the preferred embodiment of the present invention comprises a circular shape, the overall shape of the present invention can be any geometric shapes, such as square, rectangular, or triangular.

Figure 2:
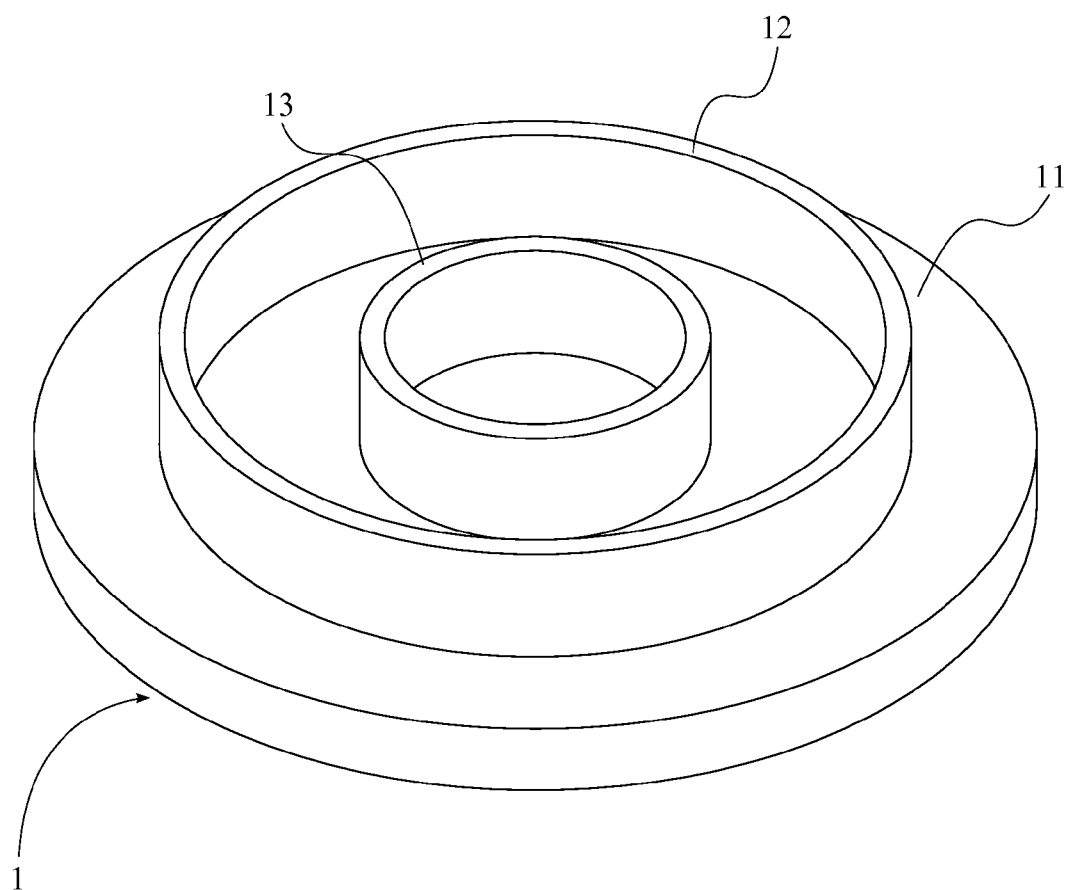
FIG. 2 is a top perspective view of a base of the present invention.

In reference to FIG. 2, the base 1 comprises a platform 11, a protrusion 12, and a bottom spring connector 13. The base 1 provides stability to the present invention and a foundation for the rest of the components of the present invention. The protrusion 12 and the bottom connector are perpendicularly connected with the platform 11, where the protrusion 12 and the bottom spring connector 13 are positioned on the platform 11. The bottom spring connector 13, which comprises a smaller parameter than the protrusion 12, is concentrically positioned within the protrusion 12. The base 1 can be made from high strength materials include, but not limited to, plastic, alloy metals, composite materials, and combination of any. The platform 11 can include added weight or weighted materials so that the base 1 can provide a stable foundation for the present invention.

Figure 3:
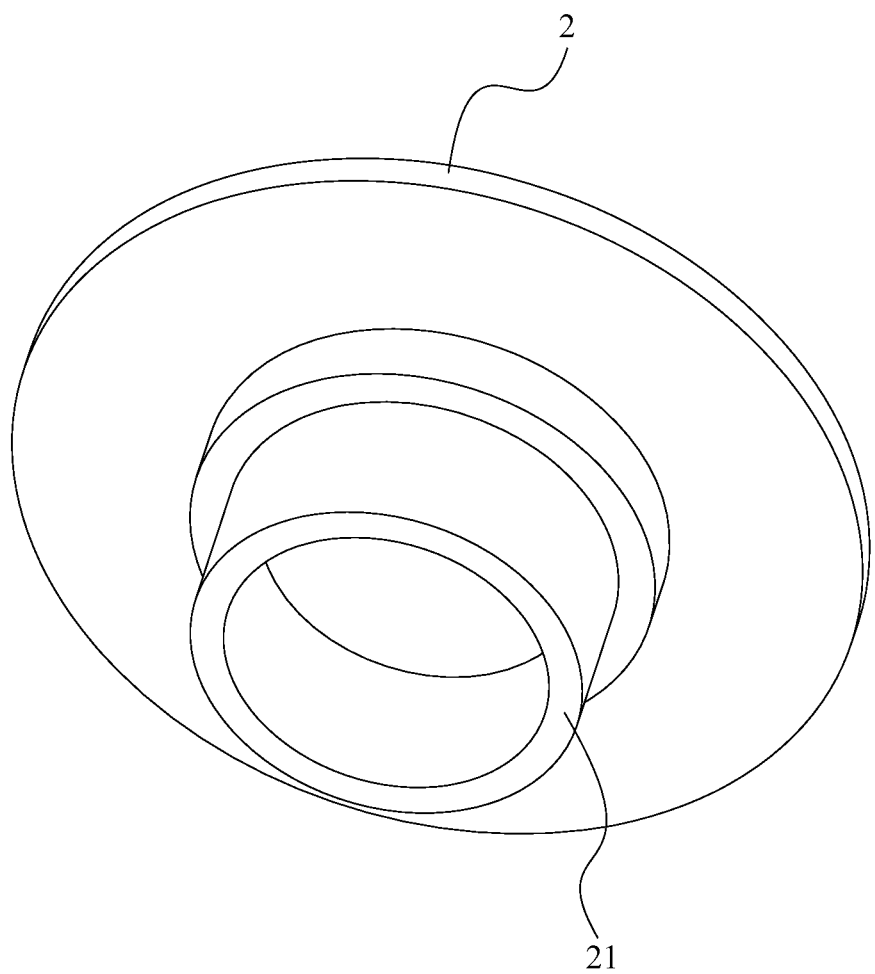
FIG. 3 is a bottom perspective view of a platen of the present invention.

In reference to FIG. 3, FIG. 8, and FIG. 9, the platen 2 is linearly positioned atop the base 1 and comprises a top spring connector 21. The platen 2 provides a support surface for the stored materials 7. The top spring connector 21, which is adjacently positioned with the platen 2 and in between the platen 2 and the base 1, concentrically connects with the platen 2. The platen 2 can be made from high strength materials include, but not limited to, plastic, alloy metals, and composite materials.

Figure 4:
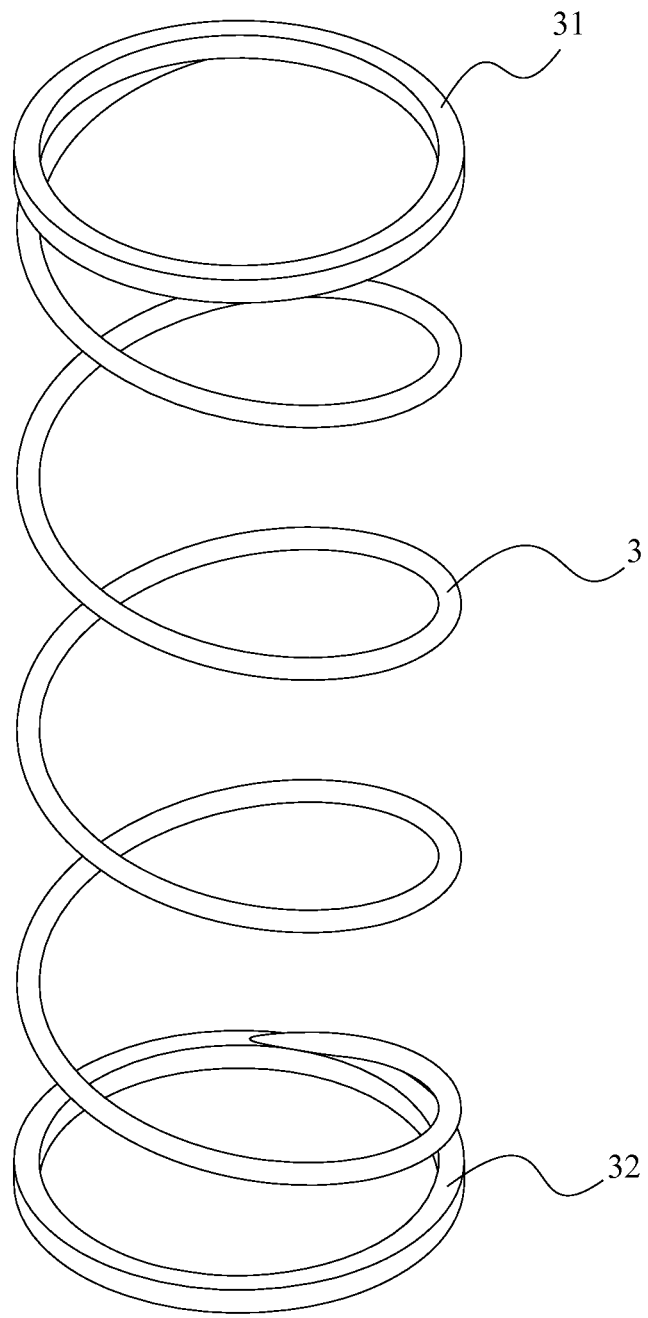
FIG. 4 is a perspective view of a spring of the present invention.

In reference to FIG. 4, FIG. 8, and FIG. 9, the spring 3 is positioned in between the base 1 and platen 2, where the spring 3 comprises a first connector rim 31 and a second connector rim 32. The natural state of the spring 3 is at compressed state, and the spring 3 is preferably made from spring steel or any other high strength and rigid materials which can elastically deform. The first connector rim 31 and the second connector rim 32 are oppositely positioned from each other along the spring 3, where the first connector rim 31 and the second connector rim 32 are positioned parallel to each other. The first connector rim 31 is concentrically positioned with the top spring connector 21 and permanently connected around the top spring connector 21, connecting the platen 2 and the spring 3. The second connector rim 32 is concentrically positioned with the bottom spring connector 13 and permanently connected around the bottom spring connector 13, where the spring 3 is connected with the base 1.

Figure 5:
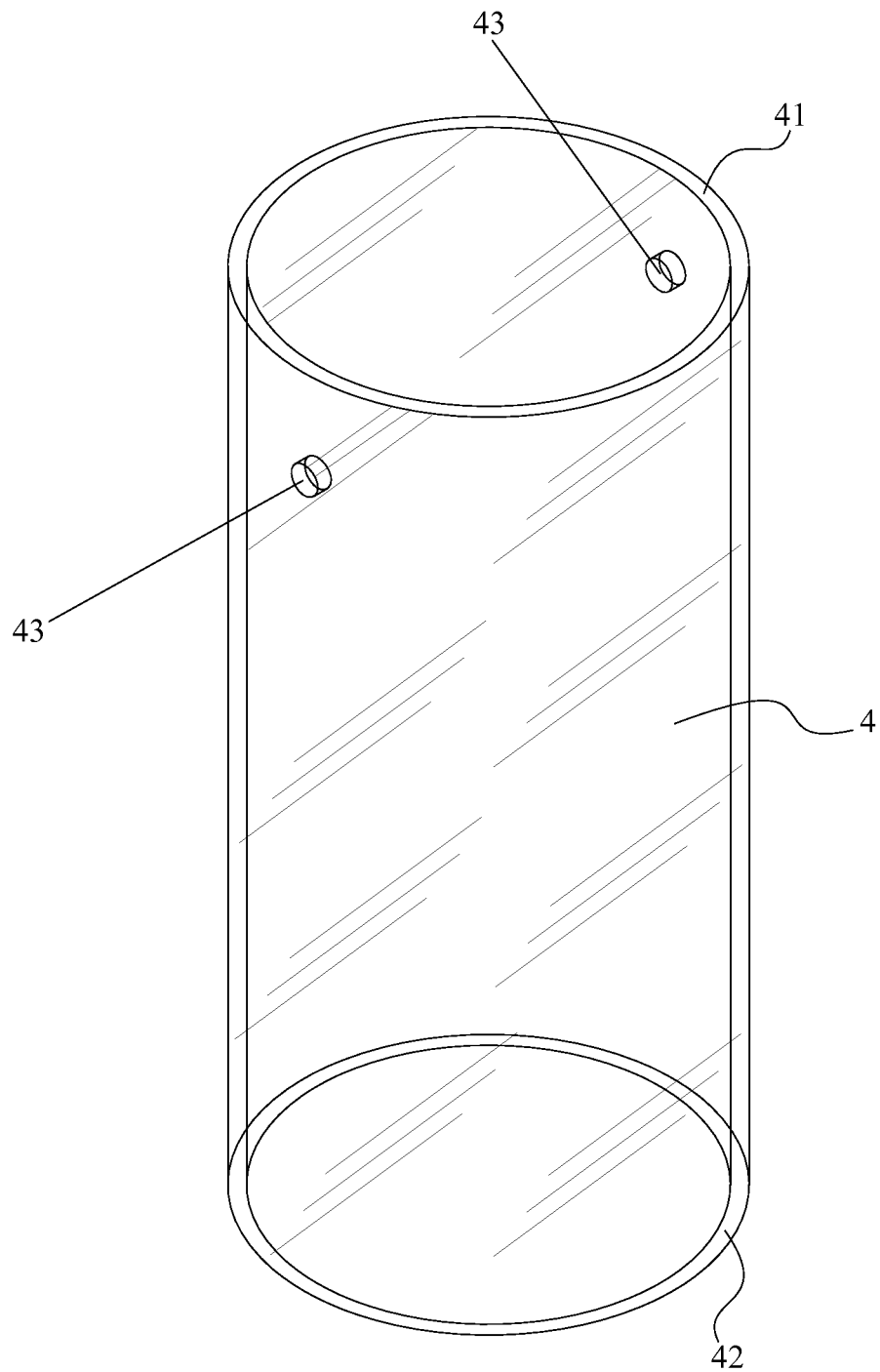
FIG. 5 is a perspective view of a casing of the present invention.

In reference to FIG. 5, FIG. 8, and FIG. 9, the casing 4, which enclosed the spring 3 and the platen 2, comprises a top rim 41, a bottom rim 42, and a pair of holes 43. The top rim 41 and the bottom rim 42 are linearly positioned along the casing 4 and oppositely positioned from each other along the casing 4. The top rim 41 comprises a top opening, and the bottom rim 42 comprises a bottom opening, where the top opening and the bottom opening are concentrically positioned within the top rim 41 and the bottom rim 42 respectively. The pair of holes 43 is linearly traversed through the casing 4, where the pair of holes 43 is perpendicularly positioned with the top rim 41 and the bottom rim 42 and adjacently positioned with the top rim 41. The casing 4 removably attaches with the base 1 while the casing 4 encloses the spring 3 and the platen 2. More specifically, the bottom rim 42 and the casing 4 are concentrically positioned within the protrusion 12, where the casing 4 is removably attached with the protrusion 12, and the bottom rim 42 is removably attached with the platform 11. The casing 4 can be made from high strength materials include, but not limited to, transparent plastic, semi-transparent plastic, opaque plastic, alloy metals, and composite materials. The casing 4 provides a parameter wall for the stored materials 7 so that the stored materials 7 are firmly positioned within the casing 4.

Figure 6:
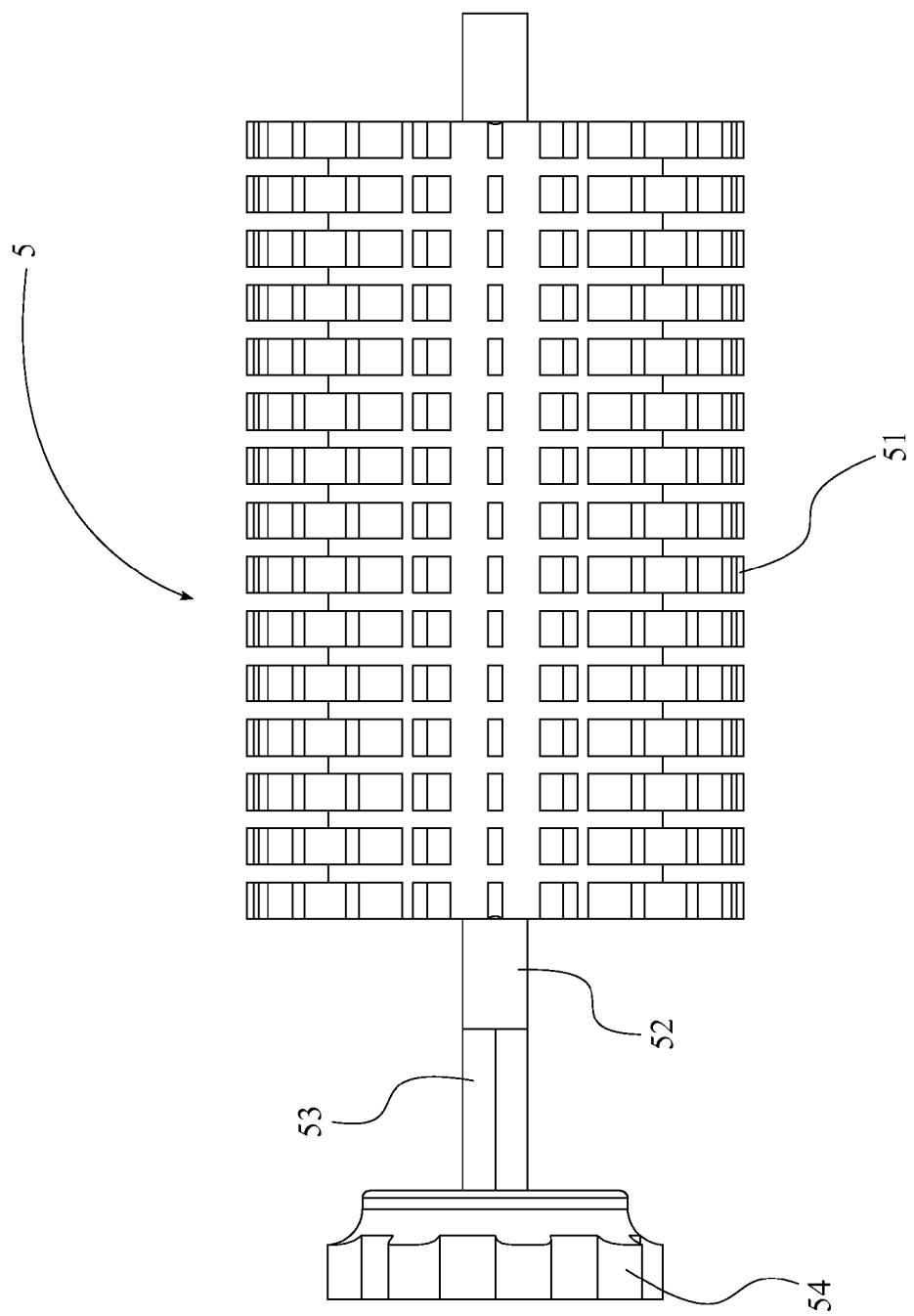
FIG. 6 is a side view of a material pick-up mechanism of the present invention.
Figure 10:
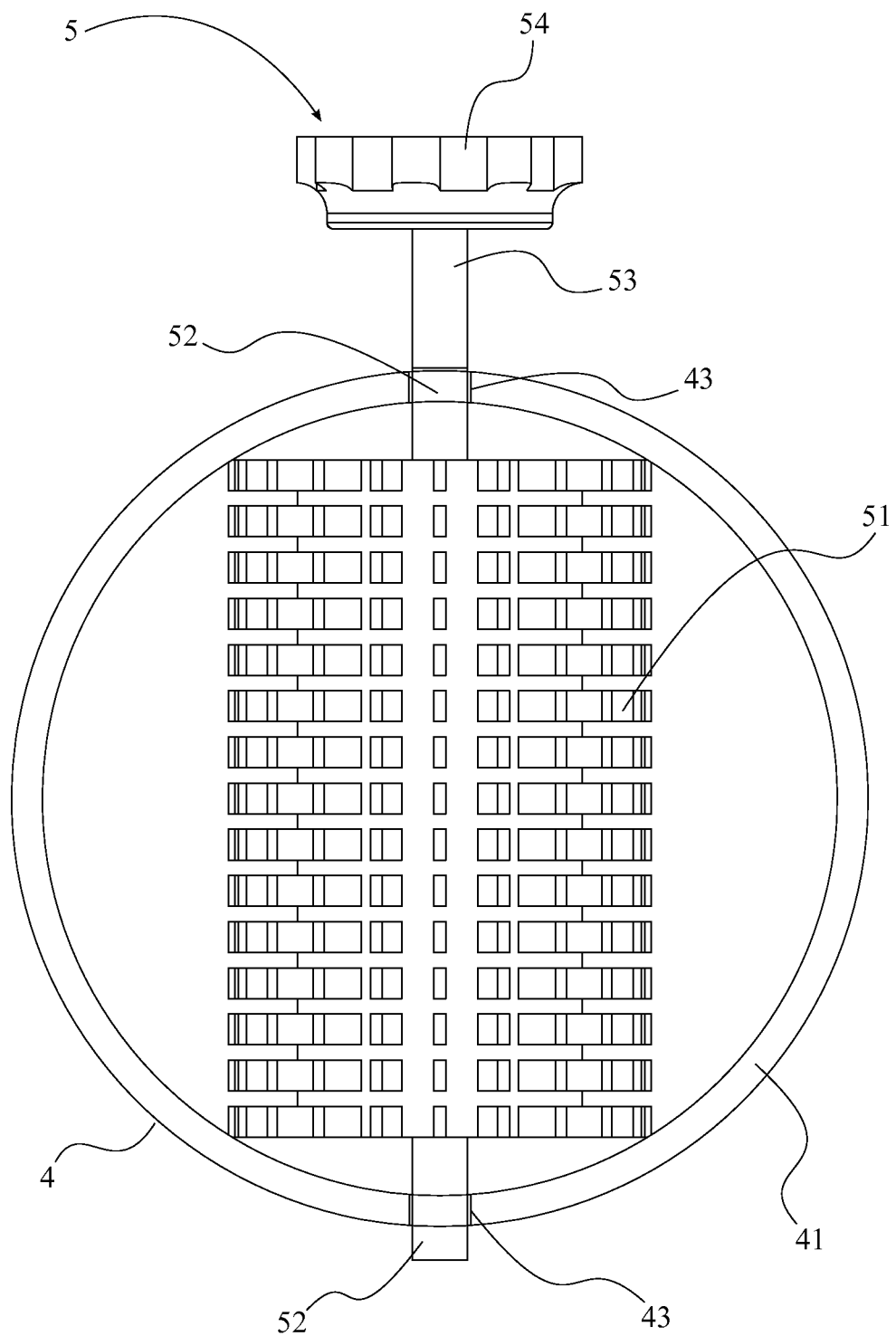
FIG. 10 is a top view of the casing and the material pick-up mechanism of the present invention.

In reference to FIG. 6, FIG. 9, and FIG. 10, the material pick-up mechanism 5 comprises a grabbing section 51, a shaft section 52, a locking section 53, and a knob 54. The material pick-up mechanism 5 is rotatably coupled with the casing 4 so that the material pick-up mechanism 5 can dispense the stored materials 7 through the top opening. The grabbing section 51, the shaft section 52, the locking section 53, and the knob 54 are linearly positioned with each other and create the material pick-up mechanism 5. The shaft section 52 and the locking section 53 are adjacently connected to each other. The shaft section 52, which comprises a rounded body with continuously curve outer surface, is rotatably positioned within the pair of holes 43. Since the shaft section 52 is rotatably positioned within the pair of holes 43, the shaft section 52 and the pair of holes 43 function as the connection point between the material pick-up mechanism 5 and the casing 4. The locking section 53 comprises at least two linear sides, where the at least two linear sides are able to lock the material pick-up mechanism 5 within the present invention when the present invention is not used by the user. The locking section 53 is adjacently positioned with the outside of the casing 4. The grabbing section 51 is adjacently connected around the shaft section 52 and oppositely positioned from the locking section 53, where the grabbing section 51 is positioned within the casing 4. The knob 54 is adjacently connected with the locking section 53 opposite from the grabbing section 51. The knob 54 provides a surface for the user so that the user can rotate the material pick-up mechanism 5. When the material pick-up mechanism 5 is rotated by the user, the grabbing section 51 of the present invention is able to grasp the stored materials 7 as the stored materials 7 are located within the casing 4 and in between the platen 2 and the grabbing section 51. Each time the user rotate the knob 54, the grabbing section 51 is able to dispense precise amount of stored materials 7 through the top opening. Depending on the type of stored materials 7, the grabbing section 51 can differ within the present invention. For example, if the present invention is filled with paper tissues or any other type of fragile material as the stored materials 7, adhesive or non-adhesive tacky roll can be used as the grabbing section 51. If the present invention is filled with clothing pads or any other type of sturdy supplies as the stored materials 7, a brush can be used as the grabbing section 51.

Figure 7:
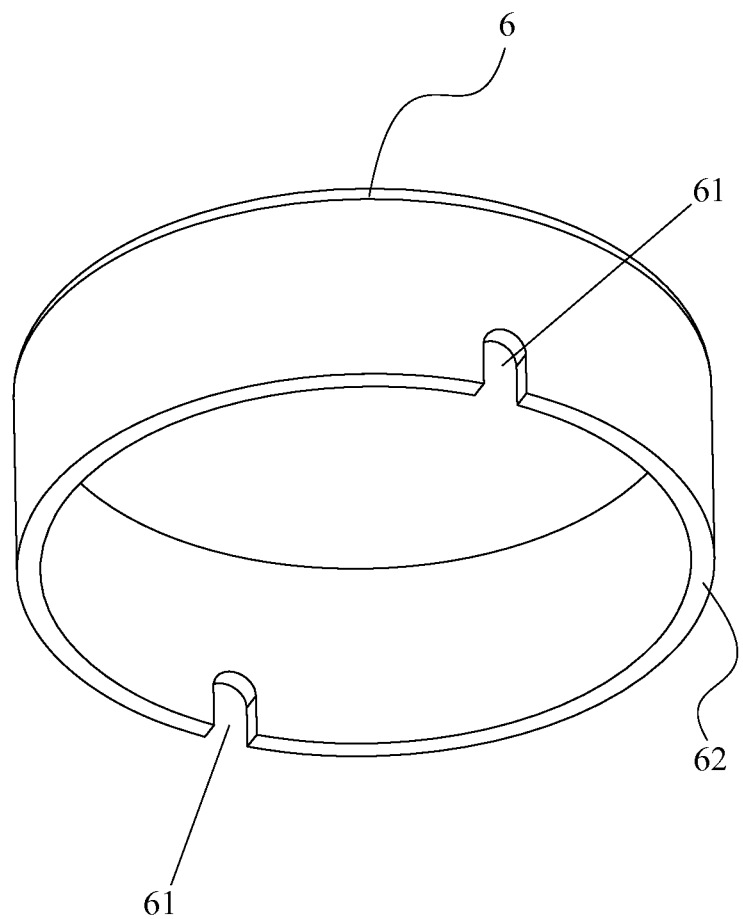
FIG. 7 is a bottom perspective view of a cap of the present invention.

In reference to FIG. 7, FIG. 8, and FIG. 9, the cap 6 that comprises a pair of locking openings 61 and a cap rim 62 is concentrically positioned with the casing 4, and the cap 6 is removably attached with the casing 4. The cap rim 62 is positioned on the cap 6, where the cap rim 62 provides the opening of the cap 6. The pair of locking openings 61 is linearly positioned on the cap 6 and the cap rim 62 and provides gaps in the cap rim 62. Each of locking openings 61 comprises at least two locking linear sides that correlate with the at least two linear side of the locking section 53. When the cap 6 is removably attached with the casing 4, the cap rim 62 is concentrically positioned with the top opening, the top opening is adjacently positioned with the cap 6, and the pair of locking openings 61 is positioned around the locking section 53 and the shaft section 52. More specifically, one of the locking opening 61 is positioned around the locking section 53, and the other locking opening 61 is positioned around the shaft section 53. Since the cap 6 is removably attached with the casing 4, the at least two locking linear sides are positioned parallel with the at least two linear sides of the locking section 53. The positioning of the at least two locking linear sides and the at least two linear sides restrict the user from rotating the material pick-up mechanism 5 while the top opening is closed with the cap 6.

Figure 11:
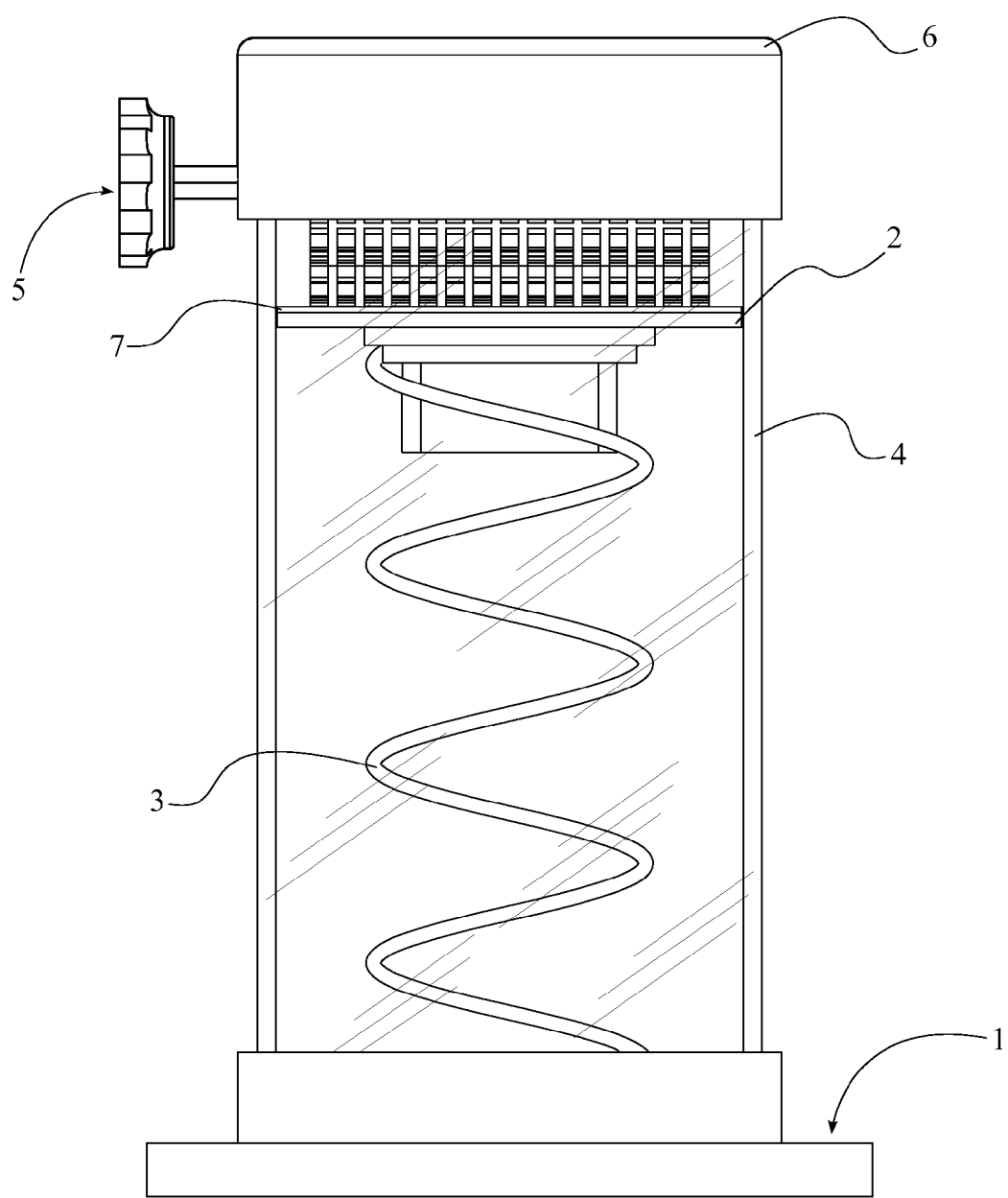
FIG. 11 is a front view of the present invention and a single stored material, wherein the spring is at its natural state.

In reference to FIG. 11, and FIG. 12, when the materials 7 are stored within casing 4, the volume of the stored materials 7 push down the platen 2 toward the base 1, compressing the spring 3. As the stored materials 7 dispense through the top opening, the spring 3 pushes the platen 2 upward, allowing the stored materials 7 to adjacently position with the material pick-up mechanism 5. In order to keep track of the amount stored materials 7 if the casing 4 is not transparent, color coded materials 7 are positioned with the bottom of the stored materials 7. When the present invention starts dispensing the color coded materials 7 through the top opening, the color coded materials 7 notify the user that the quantity of stored materials 7 is low within the present invention. Once the present invention dispenses all of the stored materials 7, new materials 7 can be stored into the present invention. The user can remove the casing 4 from the base 1, and then the new materials 7 are loaded on to the platen 2, compressing the spring 3. Then the casing 4 is attached back to the base 1.

Since the stored materials 7 are kept clean within the present invention while maintaining manufactures specification and can be easily carried by the users into different locations, the present invention can be used in wide variety of fields such as, medical field, dust free materials assembly field, construction field, and outdoor or indoor shooting range. The stored materials 7 within the present invention are able to perform up to the manufactures specification throughout the shelf life of the stored materials 7, providing maximum effectiveness. The present invention may optionally comprise a plurality of batteries, heating coils, and a thermostat to control the inside temperature of the casing 4. The plurality of batteries and the thermostat may position on the platform opposite from the casing 4, and the heating coils may position on the platform 11 in between the protrusion 12 and the bottom spring connector 13. The plurality of batteries, the heating coils, and the thermostat are electrically connected with each other. The heating coils able to maintain user defined temperatures or room temperature within the casing 4 during colder temperature conditions, where the temperature is controlled by the thermostat.

Although the invention has been explained in relation to its preferred embodiment, it is to be understood that many other possible modifications and variations can be made without departing from the spirit and scope of the invention as hereinafter claimed.

What is claimed is:

1. A material dispenser comprises;
   a base;
   a platen;
   a spring;
   a casing;
   a material pick-up mechanism;
   a cap;
   the base comprises a platform, a protrusion, and a bottom spring connector;

the platen comprises a top spring connector;
the casing comprises a top rim, a bottom rim, and a pair of holes;
the material pick-up mechanism comprises a grabbing section, a shaft section, a locking section, and a knob;
the cap being removably attached with the casing;
the cap comprises a pair of locking openings and a cap rim;
the cap rim being positioned on the cap;
the cap rim being concentrically positioned with the top rim;
the cap being adjacently positioned with the top rim;
the pair of locking openings being linearly positioned on the cap and the cap rim, wherein the pair of locking openings provides gaps in the cap rim; and
the pair of locking openings being positioned around the locking section and the shaft section.

2. The material dispenser as claimed in claim 1 comprises;
the protrusion and the bottom spring connector being perpendicularly connected with the platform;
the protrusion and the bottom spring connector being positioned on the platform; and
the bottom spring connector being concentrically positioned within the protrusion.

3. The material dispenser as claimed in claim 1 comprises;
the platen being linearly positioned atop the base;
the top spring connector being concentrically connected with the platen;
the top spring connector being positioned in between the platen and the base; and
the top spring connector being adjacently positioned with the platen.

4. The material dispenser as claimed in claim 1 comprises;
the spring being positioned in between the base and the platen;
the spring comprises a first connector rim and a second connector rim;
the first connector rim and the second connector rim being oppositely positioned from each other along the spring; and
the first connector rim and the second connector rim being positioned parallel to each other.

5. The material dispenser as claimed in claim 4 comprises;
the first connector rim being connected around the top spring connector;
the second connector rim being connected around the bottom spring connector; and
the first connector rim being concentrically positioned with the top spring connector; and
the second connector rim being concentrically positioned with the bottom spring connector.

6. The material dispenser as claimed in claim 1 comprises;
the spring and the platen being enclosed by the casing;
the casing being removably attached with the base;
the top rim and the bottom rim being linearly positioned along the casing;
the top rim and the bottom rim being oppositely positioned with each other along the casing;
the pair of holes being linearly traversed through the casing; and
the pair of holes being adjacently positioned with the top rim.

7. The material dispenser as claimed in claim 6 comprises;
the casing being removably attached within the protrusion;
the bottom rim being removably attached with the platform;
the casing being concentrically positioned within the protrusion; and
the bottom rim being concentrically positioned within the protrusion.

8. The material dispenser as claimed in claim 1 comprises;
the material pick-up mechanism being rotatably coupled with the casing;
the grabbing section, the shaft section, the locking section, and the knob being linearly positioned with each other;
the shaft section and the locking section being adjacently connected to each other;
the grabbing section being adjacently connected around the shaft section opposite from the locking section; and
the knob being adjacently connected to the locking section opposite from the shaft section.

9. The material dispenser as claimed in claim 8 comprises;
the shaft section being rotatably positioned within the pair of holes;
the grabbing section being positioned within the casing; and
the locking section being adjacently positioned with the casing.

10. A material dispenser comprises;
a base;
a platen;
a spring;
a casing;
a material pick-up mechanism;
a cap;
the base comprises a platform, a protrusion, and a bottom spring connector;
the platen comprises a top spring connector;
the casing comprises a top rim, a bottom rim, and a pair of holes;
the material pick-up mechanism comprises a grabbing section, a shaft section, a locking section, and a knob;
the platen being linearly positioned atop the base;
the spring being positioned in between the base and the platen;
the spring and the platen being enclosed by the casing;
the casing being removably attached with the base;
the material pick-up mechanism being rotatably coupled with the casing;
the cap being removably attached with the casing;
the cap comprises a pair of locking openings and a cap rim;
the cap rim being positioned on the cap;
the pair of locking openings being linearly positioned on the cap and the cap rim, wherein the pair of locking openings is a gap in the cap rim;
the cap rim being concentrically positioned with the top rim;
the pair of locking openings being positioned around the locking section and the shaft section; and
the cap being adjacently positioned with the top rim.

11. The material dispenser as claimed in claim 10 comprises;
the grabbing section, the shaft section, the locking section, and the knob being linearly positioned with each other;
the shaft section and the locking section being adjacently connected to each other;
the grabbing section being adjacently connected around the shaft section opposite from the locking section;
the knob being adjacently connected to the locking section opposite from the shaft section;
the shaft section being rotatably positioned within the pair of holes;
the grabbing section being positioned within the casing; and the locking section being adjacently positioned with the casing.

12. The material dispenser as claimed in claim 10 comprises;
   the top rim and the bottom rim being linearly positioned along the casing;
   the top rim and the bottom rim being oppositely positioned with each other along the casing;
   the pair of holes being linearly traversed through the casing;
   the pair of holes being adjacently positioned with the top rim;
   the casing being removably attached within the protrusion;
   the bottom rim being removably attached with the platform;
   the casing being concentrically positioned within the protrusion; and
   the bottom rim being concentrically positioned within the protrusion.

13. The material dispenser as claimed in claim 10 comprises;
   the protrusion and the bottom spring connector being perpendicularly connected with the platform;
   the protrusion and the bottom spring connector being positioned on the platform;
   the bottom spring connector being concentrically positioned within the protrusion;
   the top spring connector being concentrically connected with the platen;
   the top spring connector being positioned in between the platen and the base; and
   the top spring connector being adjacently positioned with the platen.

14. The material dispenser as claimed in claim 10 comprises;
   the spring comprises a first connector rim and a second connector rim;
   the first connector rim and the second connector rim being oppositely positioned from each other along the spring;
   the first connector rim and the second connector rim being positioned parallel to each other;
   the first connector rim being connected around the top spring connector;
   the second connector rim being connected around the bottom spring connector;
   the first connector rim being concentrically positioned with the top spring connector; and
   the second connector rim being concentrically positioned with the bottom spring connector.

* * * * *